March 14, 1933. J. M. CHRISTMAN 1,901,712
MOTOR VEHICLE TRANSMISSION MECHANISM
Filed Oct. 16, 1930
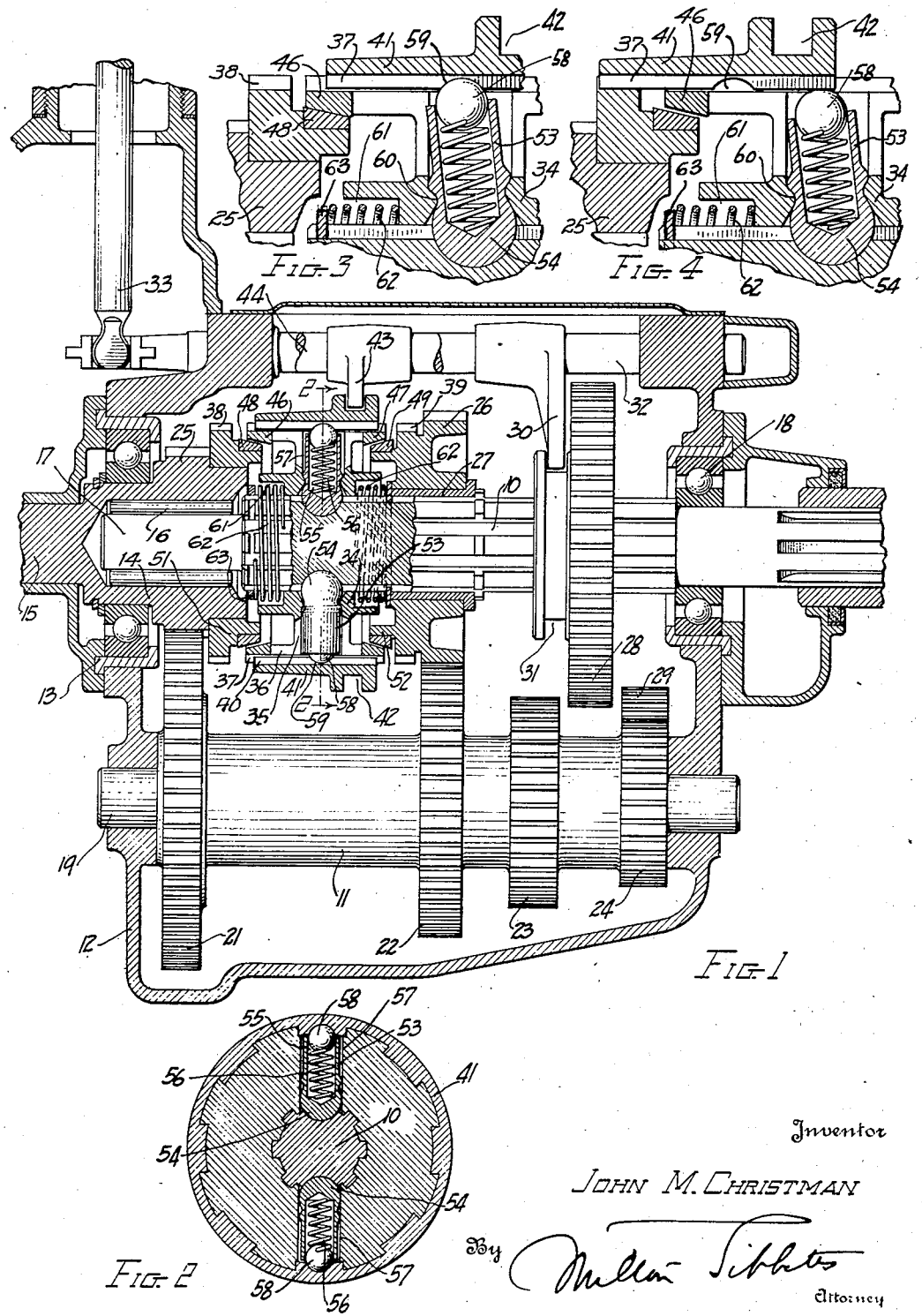
Inventor
JOHN M. CHRISTMAN
By William Tibbetts
Attorney Patented Mar. 14, 1933

1,901,712

UNITED STATES PATENT OFFICE

JOHN M. CHRISTMAN, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE TRANSMISSION MECHANISM

Application filed October 16, 1930. Serial No. 489,085.

This invention relates to motor vehicles and more particularly to the transmission gearing of such vehicles.

In the operation of motor vehicles, it is requisite to smooth gear changing that the gears which are to be meshed be brought to the same or substantially the same peripheral speed before engagement of the gear teeth. Thus after disconnection of the vehicle clutch and the previously meshed gears of a conventional transmission, the operator must either wait for a more rapidly moving gear element to lose speed, or in some instances must accelerate a more slowly moving gear by reconnecting it to the engine through the clutch. These maneuvers require a considerable measure of skill on the part of the operator and also prevent the free and rapid changing from one gear train to another as the exigencies of vehicel operation may distate, so that gear changing has come to be considered as perhaps the most difficult task incident to the operation of a motor vehicle.

To assist the operator in making rapid and quiet shifts, it has been heretofore proposed to synchronize the gears to be meshed by various means, such as friction clutches, in which driving gears are selectively connected to the driven shaft by toothed clutch elements concentric with the shaft, engagement of these two elements being preceded by synchronization through a friction clutch. In the operation of such devices it has been found that in some instances the concentric clutch teeth have been brought to the same speed by the synchronizing means in a position such that the teeth are in axial alignment, end to end, thus preventing their engagement.

The present invention constitutes an improvement on devices of the nature referred to, and one of its objects is to provide a synchronizing device in which the synchronizing clutch shall be released after synchronization and before engagement of the positive clutch connection, so as to permit a slight relative movement between the positive clutch elements whereby they may be easily intermeshed.

Another object of the invention is to provide simple and reliable means for synchronizing the elements to be intermeshed and automatically releasing the synchronizing means, in which all the elements of the device shall be carried between the rotating members so that rubbing of parts at high relative speeds, with the consequent wear of the parts, shall be avoided.

A further object of the invention is to provide synchronizing means which shall be automatically disengaged upon a predetermined pressure between the friction elements thereof.

Other objects of the invention will appear from the following description taken in connection with the drawing, which form a part of this specification, and in which:

Fig. 1 is a view, partially in side elevation and partially in vertical section through a motor vehicle transmission constructed in accordance with this invention;

Fig. 2 is a view in section taken substantially on the line 2—2 of Fig. 1, and

Figs. 3 and 4 are fragmentary detail views of part of the transmission shown in Fig. 1, illustrating successive positions of the device during a characteristic gear changing operation.

Referring to the drawing, in Fig. 1 is shown a motor vehicle transmission comprising a splined transmission shaft 10 and a countershaft or gear spool 11, mounted in a housing or transmission case 12. The front wall of the housing 12 carries a suitable bearing 13 in which is mounted the enlarged rear end 14 of a driving shaft 15, which may be the vehicle clutch shaft, driven from the vehicle engine through conventional clutch mechanism (not shown). The enlarged end 14 of the clutch shaft is formed with an axial recess for the reception of a bearing 16, in which the reduced forward end 17 of the transmission shaft 10 is journaled. The rear end of the shaft 10 is journaled in a bearing 18, supported in the rear wall of the housing 12, and is connected in the usual way to the propeller shaft to drive the vehicle, this connection not being shown.

The countershaft 11 is in the form of a hollow spool, mounted to rotate on an arbor 19 supported at its ends by the transmission case walls, and this spool is formed with a number of integral gears 21, 22, 23, and 24. Of these, the gear 21 is in constant mesh with a gear or pinion 25, formed on the enlarged end 14 of the shaft 15, so that the countershaft 11 is continuously connected to and driven from this clutch shaft 15 in the well known manner. The gear 22 is also continuously in mesh with a gear 26 which is mounted for rotation on a bearing sleeve 27, pressed or otherwise rigidly mounted on the shaft 10 as will be readily understood.

Gears 23 and 24 constitute the low speed and reverse gears respectively, and are adapted to drive a gear 28 which is splined to and slidable on the shaft 10, this gear 28 being directly engageable with the gear 23. It may be driven from the gear 24 through a reverse idler pinion 29 in the well known manner. Such sliding action is effected in the usual way by means of a shifter fork 30, which engages in a groove 31 in the body of the gear 28, this fork being actuated by a shifter rod 32 slidably mounted in suitable bearings in the upper part or cover portion of the casing 12. The shifter rod 32 is selectively actuated by a lever 33 of usual form which may be manually operated by the vehicle driver in the well known manner. Thus in the illustrated embodiment of the invention, gear 28 may be moved to mesh with gear 23, to provide a first speed, or connected through pinion 29 to gear 24 to provide a reverse. Second speed is provided by connecting the constant mesh gear 26 to the shaft 10, and third or high speed is secured by coupling the shafts 10 and 15, thus providing a direct drive.

To provide the second and high speed connections described, the forward portion of the shaft 10 is provided with a clutch device which is slidably secured to the shaft between the gears 25 and 26. This constitutes a splined hub portion 34, slidably mounted on the splines of the shaft 10 and rotatable therewith, a radial web portion 35, and an axially disposed rim portion 36 which is provided with external splines or teeth 37. These teeth 37 are adapted for rotation either with clutch teeth 38, formed on the shaft end 14 adjacent the pinion 25, or with clutch teeth 39 formed on the body of gear 26, these clutch teeth 37, 38 and 39 being of the same pitch. To this end a hollow clutch ring 41 is slidably mounted on and surrrounds the rim 36, and is provided with internal splines 40 cooperating with the splines 37 which may engage the teeth 38 when the ring is moved forwardly of the transmission, and may engage the teeth 39 when moved rearwardly thereof. To effect such sliding movement, the clutch ring is provided with a shifter groove 42, actuated by a shifter fork 43, which is connected to a shifter rod 44 similar to the rod 32 and likewise selectively operated by the gear shift lever 33. It will be evident that when the clutch ring is in engagement with the teeth 39, the constant mesh gear 26 is locked to the shaft 10, providing the second speed, and that when the teeth 38 are engaged with the clutch ring the shafts 10 and 15 are directly coupled, giving the third speed which is direct drive.

To perform the clutching operation just described without shock or clash, a synchronizing device is provided to bring the pairs of clutch teeth 37—38 or 37—39 to substantially the same speed just before positive engagement of the clutch ring 41. For this purpose, the oppositely disposed inner edges of the rim portion 36 are formed with conical friction surfaces 46 and 47, which may be detachable rings if desired. The surface 46 is adapted to contact a conical friction clutch ring 48 when the hub 34 is moved forwardly or toward the left in Fig. 1, and the surface 47 is adapted to contact a similar friction clutch ring 49 when the hub is moved rearwardly or toward the right. These rings may be of any suitable material, such as bronze, and are preferably formed as independent members, pressed or otherwise secured on axially disposed extensions 51 and 52 on the shaft end 14 and on the gear body 26 respectively.

The corresponding members 46—48 or 47—49 of each of these friction clutch devices are so spaced as to be engaged upon a relatively small axial movement of the hub 34 from its neutral position, and with considerable pressure, so that the relatively rotating members are synchronized by being frictionally connected before intermeshing contact of the positive clutch device.

Operation of the synchronizing or friction clutch device is effected by the movement toward clutching position of the ring 41, through suitable lever mechanism, which comprises a pair of levers 53, fulcrumed at their inner ends on the shaft 10 and adapted to communicate sliding motion of the clutch ring 41 to the hub 34 at a reduced amplitude but with increased pressure. The levers 53 are provided at their inner ends with rounded fulcrum portions 54 seated in suitable recesses in the shaft 10, and each is provided with a bore 55. A spring 56 is disposed within the bore. The levers extend radially through slots 57 in the clutch device, these slots extending through the hub 34, the web 35 and the rim portion 36. At its outer end each of the levers 53 carries a ball 58 seated in the bore 55 in contact with the spring 56, each engaging in a shallow recess 59 formed in the top of one of the internal splines of the clutch ring 41. Intermediate its ends each of the levers 53 has a bearing between suitable abutments 60 on the hub member 34, the relation of these abutments to the ends of the levers being such, in the embodiment illustrated, as to make the mechanical advantage about four to one.

Each end of the hub member 34 is counterbored as shown at 61 for the reception of a coil spring 62, which surrounds the shaft 10 and which bears at one end on the member 34 at the inner end of the bore, and at the other end on a suitable abutment such as a collar 63 secured to the shaft 10. The springs 62 are oppositely disposed and one or the other of them is compressed whenever the member 34 is moved away from its central or neutral position in either direction. Hence it will be evident that these springs are operative to move the member 34 away from either member 51 or 52, and thereby disengage the friction clutch device, as soon as the levers 53 are disconnected from the clutch ring 41. The slight relative movement permitted by such uncoupling of the driving and driven members enables the splines on the clutch collar 41 to readily engage the teeth 38 or 39 as the case may be, so that the clutch is easily and noiselessly engaged.

The operation of this device will be readily understood from the foregoing description. Assume that it is desired to change the gearing to high speed, and that the parts are in neutral position as shown in Fig. 1. From this position the operator first moves the clutch ring 41, through the shifter rod 44 and lever 33, forwardly or toward the left in the direction of the clutch teeth 38. This also carries forward the outer ends of the levers 53, the balls 58 of which are seated in the recesses 59, which thus exerts pressure on the abutments 60, tending to move the entire clutch device forwardly. This brings the friction faces 46 and 48 of the friction clutch device into contact with a high axial pressure, frictionally connecting the shafts 10 and 15, so that the shaft 15 is rapidly brought up to the speed of the shaft 10. At this stage of the operation the parts are in the position shown in Fig. 3.

Continued movement of the clutch ring 41 is resisted, through the levers, by the axial reaction to the pressure exerted upon the friction face 46. When the pressure on the ring 41 exceeds a predetermined amount, the springs 56 are depressed, permitting the balls 58 to ride out of their notches 59, thus disengaging the levers 53 from the ring 41, and permitting the ring 41 to continue its forward movement, each of the balls 58 sliding on one of the splines as shown. The splines then easily slide into intermeshing engagement with the teeth 38, while the springs 62 act to move the member 34 rearwardly, thus disengaging the friction clutch elements 46 and 48 as previously explained. The shafts 15 and 10 are now directly and positively coupled together, giving a direct drive for the vehicle, as clearly shown in Fig. 4. A change down from high to second gear is effected in a similar manner as will be readily understood, the clutch ring 41 in this case being moved rearwardly to first engage the friction faces 47 and 49, and then to connect the clutch teeth 37 and 39. In this case the levers 53 are inclined toward the rear.

It will be evident that this invention may be also applied to synchronization of the first speed and reverse gears if desired, and that it may be readily embodied in transmissions having four or more speed ratios as well as in the three speed transmission described.

It will be understood that this invention provides a synchronizing mechanism which is completely carried by the rotating elements, avoiding high rubbing speeds under heavy pressures and the excessive wear incident thereto. Moreover, as the synchronizing clutch is disengaged just prior to engagement of the main clutch, a slight relative movement between the elements of the positive clutch is permitted, thus ensuring prompt and easy engagement of the clutch teeth. At the same time complicated mechanism for accurately timing the friction clutch release is avoided and the release of this device is accomplished automatically by a simple and effective device.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. In a motor vehicle transmission having driving and driven members, a positive clutch device having an element secured to one member and a cooperating element slidably mounted in driving relation on the other member, means connected to slide said positive clutch element, a friction clutch between said members having a sliding element, yieldable means connecting said sliding element and independent of said positive clutch sliding means to engage said friction clutch upon preliminary movement of the positive clutch element toward engaging position, and spring means associated to automatically disengage the friction clutch upon yielding of said connecting means.

2. In a motor vehicle transmission having driving and driven members, a positive clutch device axially shiftable to connect said members, a friction device to frictionally connect said members, yieldable means to transmit axial pressure from the positive clutch device to said friction device against the resistance of said friction device, and a spring within the friction device adapted to resist shifting movement of the friction clutch device and operable to disengage such device upon yielding of said transmitting means.

3. In a motor vehicle transmission having driving and driven members, a synchronizing device comprising a friction clutch device slidable on one of the members to frictionally connect said members, a toothed clutch member slidable on the frictional device to positively connect said members, means including levers to transmit sliding movement of the toothed clutch member to the friction clutch device, said levers having a yieldable connection to the toothed clutch member, and coil springs anchored at one end with the driven member and bearing against the friction clutch device to urge said clutch device toward neutral position, said springs being operable to disengage the friction clutch device upon yielding of said connection.

4. In a motor vehicle transmission having a driving and a driven member, a friction clutch element surrounding the driven member and slidably mounted thereon to connect said members in synchronizing relation, a positive clutch element slidably mounted coaxially with said friction clutch element and surrounding substantially the same portion of the driven member surrounded by said friction clutch element, control means to move said positive clutch element to connect said members in positive driving relation, means connecting said elements operated upon initial connecting movement of said positive clutch element to slide said friction clutch element into synchronizing relation, and automatic means connected to said friction clutch element to move it out of synchronizing relation upon further connecting movement of said positive clutch element toward engaging position.

5. In a motor vehicle transmission having a driving and a driven member, a hollow positive clutch element shiftable on one of said members to connect said members in positive driving relation, a friction clutch element shiftable on one of said members to engage said members in synchronizing relation, automatic means tending to move said friction element out of synchronizing relation, and means connecting said elements to shift said friction element into synchronizing position, said friction clutch element and said automatic means being surrounded by said positive clutch element, said connecting means being disposed to be engaged and moved into synchronizing relation by the positive clutch element during initial movement thereof toward driving position and said automatic means operating thereafter to disengage said friction clutch element upon further movement of said positive clutch element toward driving position.

6. In a motor vehicle having a driving and a driven member, a positive clutch element axially shiftable to connect said members, a friction element to connect said members, releasable means connecting the positive clutch element to said friction element during initial movement toward clutching position, an abutment on one of said members, and a spring between said abutment and said friction element, said spring being adapted to resist shifting movement of the friction element and operable to disengage such element upon release of said connecting means.

7. In a motor vehicle transmission having a driving and a driven member, a shiftable positive clutch element engageable with one of the members and engaging the other member, a friction clutch element shiftable with the positive clutch element and in advance thereof, said friction clutch element being engaged with the same member as the positive clutch element and synchronizing with the other member, means releasably connecting the friction clutch element with the positive clutch element, said means releasing the connection between the elements after synchronizing has started and prior to engagement of the positive clutch element, and spring means connected with the friction element moving it from synchronizing relation upon the release of said connecting means.

8. In a motor vehicle having a driving and driven member in alignment, a shiftable positive clutch element encircling one of the members and engageable with the other member, a friction clutch element within the positive clutch element engaging the encircled member and the positive clutch element and slidable axially relative thereto, an axially extending flange on the friction clutch element, an abutment on the encircled member, a coil spring surrounding the encircled member and bearing at its ends against said flange and abutment, and releasable means connecting the clutch elements together during initial shifting of the positive clutch element and until the friction clutch element is in synchronizing relation.

In testimony whereof I affix my signature.
JOHN M. CHRISTMAN.